United States Patent [19]

Wong

[11] Patent Number: 5,397,611
[45] Date of Patent: Mar. 14, 1995

[54] EXPANDABLE FILMS AND MOLDED PRODUCTS THEREFROM

[75] Inventor: Raymond S. Wong, San Ramon, Calif.

[73] Assignee: The Dexter Corporation, Pittsburg, Calif.

[21] Appl. No.: 103,988

[22] Filed: Aug. 10, 1993

Related U.S. Application Data

[62] Division of Ser. No. 693,695, Apr. 30, 1991, Pat. No. 5,234,757.

[51] Int. Cl.⁶ .......................... B32B 1/08; B32B 1/10; B32B 5/16; B32B 5/20; B32B 31/26
[52] U.S. Cl. .................................... 428/35.7; 264/51; 264/54; 428/35.8; 428/35.9; 428/36.1; 428/36.2; 428/36.3; 428/36.4; 428/36.5; 428/36.8; 428/36.91; 428/224; 428/253; 428/255; 428/286; 428/287; 428/305.5; 428/313.5; 428/316.6; 428/317.9; 428/319.3
[58] Field of Search .................... 428/35.7, 35.8, 35.9, 428/36.1, 36.2, 36.3, 36.4, 36.5, 36.8, 36.91, 253, 255, 286, 287, 305.5, 417.9, 319.3, 224, 313.5, 316.6

[56] References Cited

U.S. PATENT DOCUMENTS 5,234,757 8/1993 Wong ............................. 428/311.1

*Primary Examiner*—James C. Cannon
*Attorney, Agent, or Firm*—George A. Skoler

[57] ABSTRACT

A thin, tacky, non-pourable film of incompatible in situ-expandable thermoplastic particles and thermosettable matrix resin that contains an essentially uniform density and thickness across the breadth of the film. The in situ-expandable mass is not pourable yet can be easily dispensed in a uniform manner within a mold and thereafter expanded to the dimensions of the mold. Composites and reinforced compositions, as well as methods of molding, are disclosed.

12 Claims, 3 Drawing Sheets

EXPANDABLE FILMS AND MOLDED PRODUCTS THEREFROM

This application is a division of application Ser. No. 07/693,695, filed on Apr. 30, 1991, now U.S. Pat. No. 5,234,757.

BRIEF DESCRIPTION OF THE INVENTION

Thin, tacky film of in situ-expandable thermoplastic particles in a thermosettable matrix resin that contains an essentially uniform density and thickness across the breadth of the film. Composites of the films and molded syntactic foam products are made by thermally curing the matrix resin in the films.

BACKGROUND TO THE INVENTION

SynCore ®, sold by The Dexter Corporation, Adhesive & Structural Materials Division, Pittsburgh, Calif. 94565 U.S.A., is a syntactic foam film that takes the place of more expensive prepreg plies in stiffening critical structures. This isotropic foam is a composite material consisting of preformed microballoons in a thermosetting matrix resin. A wide variety of preformed microballoons and matrices can be combined to make SynCore ® materials. Glass is the most common microballoon material of construction, but quartz, phenolic, carbon, thermoplastic and metal coated preformed microballoons have been used. Epoxies curing at 350° F. (177° C.) and 250° F. (121° C.) are the most common thermosetting matrix resins, but matrices of bismaleimide (BMI), phenolic, polyester, PMR-15 polyimide and acetylene-terminated resins have been used to produce SynCore ® syntactic foams. As a result of the variety of materials that successfully make SynCore ®, they are tailorable to a variety of applications. There is a version of SynCore ® available that will co-cure with all known available heat-cured composite laminating resins. Syncore ® allows sandwich core concepts to be used in a thinner dimension than previously possible. The thickness limit on honeycomb cores is approximately 0.125 inch. Syncore ® is available in 0.007 to 0.125 inch (0.18 mm to 3.2 mm) thicknesses but can be made in thinner or thicker sheet forran. Other core materials such as wood and sheet foam can be made thin, but are not drapable and generally require an expensive/heavy adhesive film to bond to the partner composite components. In addition, Syncore ® possess excellent uniformity in thickness which provides the ability to assure quality for the composite in which it is used as a component. Syncore ® is typically used to replace prepreg plies where the intent is to increase stiffness by increasing thickness.

Designing with Syncore ® is straightforward because all of the analysis methods that apply to other core materials such as honeycomb apply to it. Flexural stiffness of fiat plates and beama increases as a cubic function of thickness allowing a lighter, stiffer lamination than could be made from prepreg plies alone. Since Syncore ®, on a per volume basis, typically costs less than half of a comparable carbon prepreg, it also leads to a lower cost lamination. This is illustrated by the following:

1) Adding one ply of 0.020 inch Syncore ® and eliminating one ply of prepreg does not change the weight or cost significantly, but nearly doubles the flexural rigidity.
2) Adding one ply of 0.020 inch Syncore ® and eliminating three plies of prepreg sharply decreases the cost and weight with a small decrease in rigidity.
3) Adding one ply of 0.040 inch Syncore ® and eliminating three plies of prepreg provides lower weight, cost and sharply increases rigidity.
4) The introduction of unidirectional tape allows a further increase in performance at lower cost and weight at nearly the same thickness.
5) A hybrid tape/fabric/Syncore ® construction gives a very attractive set of weight and cost savings coupled with a 3.4 times increase in flexural rigidity.

Syncore ® has been recommended for thin composite structures in any application where flexural stiffness, buckling, or minimum gauge construction is used. It has been shown to save weight and material cost in carbon fiber composites. It has been offered to save weight at approximately the same cost in the case of glass fiber composites. Illustrative applications are covered in U.S. Pat. Nos. 4,861,649, patented Aug. 28, 1989, and U.S. Pat. No. 4,968,545, patented Nov. 6, 1990.

The manufacturing methods for employing Syncore ® are very similar to those used for prepregs. Because it is not cured, it is tacky and very drapable when warmed to room temperature and is easier to lay-up than a comparable prepreg ply. It can be supplied in supported forms with a light weight scrim to prevent handling damage when it is frozen. It requires cold storage like prepregs, usually 0° F. ($-17.7°$ C.) or below. The various Syncores ® materials typically have a room temperature out-time that is much longer than their companion prepregs. Syncore ® is less sensitive to cure cycle variations than prepreg making the controlling factor the composite cure cycle selection. It will cure void free under full vacuum or low (e.g. about 10 p.s.i.) autoclave pressure. It has been cured at up to about 150 p.s.i. without exhibiting balloon crushing.

In a typical application, a sandwich of Syncore ® and prepreg, such as a thicker layer of Syncore ® between two thinner layers of prepreg, are held together under heat and pressure to cure the structure into a strong panel. Typical sandwich constructions of this nature are shown in U.S. Pat. Nos. 4,013,810, 4,433,068 and 3,996,654. Such composite structures typically are produced in fiat sheets and in separatable molds to obtain various desired shapes.

Though Syncore ® will cure void free under significant reduced pressure or when put under pressure, it would be desirable to avoid those costly conditions to achieve void reduction. It would be desirable to have a material that has the properties of Syncore ® but achieves void free construction without costly full vacuum operations or low autoclave pressure systems. These methods are typically batch type operations that materially add to the cost of making the composite.

There are certain applications in which it is desirable to have the properties of a uniform thin drapable syntactic foam film in processing the formation of a laminated composite, yet have the capacity to autogenously expand so as to fill any void space existing in the composite's structure so as to minimize the effects of macro and micro void defects at interlaminate interfaces.

These interlaminar interfacial micro or macro void spaces are magnified by the irregularity of the reinforcing layer of the composite structure. For example, if the composite is of a layer of prepreg-derived carbon fiber reinforced thermosetting resin material, bonded to a syntactic foam, such as a Syncore® thin uniform film, the layer containing the prepreg-derived material will have an irregularly shaped surface and the Syncore® layer will have a relatively smooth uniform surface. Though the Syncore® is tacky and drapable, it is incapable of filling in all of the irregularities of the prepreg-derived layer. Application of a full vacuum or the use of a low pressure autoclave can be used to significantly reduce the void space, but complete avoidance of micro voids is not readily achievable. Also, conforming Syncore® to the irregular surface causes transfer of the irregularity to the opposite surface of the Syncore® film. Such surface irregularity transfer may be avoided by sandwiching the Syncore® film using heat and pressure, such repositions the film's matrix resin and the microspheres so that the film within the sandwiched structure loses its original uniformity.

It would be desirable to be able to adequately bond a syntactic foam thin film to an irregular surface[1] and fill the defects in the surface without tranferring the shape of the defects to the unbonded side of the film. It would also be desirable to be able to adequately bond a syntactic foam thin film to a surface and, without the use of vacuum or low pressure autoclaves, fill the micro voids with the syntactic foam without repositioning the film's matrix resin and microspheres.

[1]. Such a surface is one that may contain undulations, cracks, large pores, warpage, and the like defects.

An advantage of Syncore® for many applications resides in its uniformity of distribution of the microsphere throughout the matrix resin. Such microspheres remain essentially intact throughout the cure cycle. As a result, it is not possible to have the microspheres concentrate at one or more surfaces, or one or more other locations in the final composite. It would be desirable to have a drapable thin film, having the handling qualities of Syncores®, but which would allow the production of a syntactic foam having a controllable density gradient that accommodates specific end use applications.

There are a number of applications in which a thin film syntactic foam could serve as a seal to preclude the passage of gases and liquids. In some applications, the seal could be subjected to abrasion forces. It would be desirable to have a thin film syntactic foam that can be applied in a manner that allows it to be a sealant to gas or liquid flow in a confined space and be able to withstand abrasive forces.

There is a body of technology directed to fabricating expandable thermoplastic resinous material. For example, U.S. Pat. No. 2,958,905, patented Nov. 8, 1960, is directed to a method of making foam structures from particulate expandable granular thermoplastic resinous material containing in the particles a blowing agent for further expansion of the particles. A considerable number of thermoplastic resins are described as suitable for this purpose. The blowing agents are the conventional ones recommended for that application. The expandable granular thermoplastic resinous material may be admixed with a thermosetting resin to generate on curing the exotherm needed to expand the expandable granular thermoplastic resinous material. The resulting mass can be poured into a mold to make a number of products. The patentees indicates that the expandable granular thermoplastic resinous material can be formed in the presence of non-expandable filler materials such as staple fibers from a variety of sources, and the mixture fed to a mold for forming an expanded product. The resulting foamed product may be designed to adhesively bond to a fabric layer for reinforcement of the foamed product. The density of the foamed product can be controlled by the amount of the expandable material fed to the mold. According to the patentees, starting at column 12, lines 5 et seq., molded products are formed by charging the mold "with the expandable material in any desired manner including manual filling or pneumatic conveyance thereof." According to the description at column 12 relating to FIGS. 3 and 4 (see column 12, lines 16–32):

"a considerable occurrence of void and hollow spaces occurs between the charged expandable beads 21 in the mass to be fabricated, each of which (in the case of preexpanded material) is a foam structure containing a plurality of internal cells or open spaces. When the liquid exothermus substance is added between such interparticle voids, the heat from its spontaneous self reaction causes the beads to expand whereby, as illustrated in FIG. 4, the expanded and fabricated particles 22 force out a substantial portion (and frequently most) of the exothermus substance excepting for a minor quantity of reacted material 23 which remains, frequently as an interlaced and interlinking network between the expanded particles to assist in holding the expanded, cellular foam particles together." (Emphasis added)

U.S. Pat. No. 2,959,508, patented Nov. 8, 1960, describes another variation of using expandable thermoplastic particles. In this patent, the unexpanded particles and the exothermus substance, such as an epoxy resin, are first mixed and then poured into the mold to form a composite foam of the two when the exothermus substance heats up the mixture and causes the blowing agent to volatilize.

Thermosetting resins have had blowing agents incorporated in them (see U.S. Pat. No. 3,322,700, patented May 30, 1967) to form expanded molded products and recently, such types of resin systems have included preformed microspheres in the formation of partial syntactic foam films. These expanded thermosets comprise a more open cellular structure unlike that of syntactic foams, and the inclusion of preformed microspheres does not alter that condition.

There are commercial molding processes that utilize tacky sheets of thermosetting resins and reinforcing material. One such process involves the compression molding of sheet molding compounds ("SMC"). In that process, a thermosetting polyester resin filled with staple glass fiber and low profile thermoplastics, are sheeted out and thickened into a pourable paste retained between release surfaces such as polyethylene film. Chunks of the thickened paste are casually deposited around the surface of the mold by hand, and on closing the mold with heating, the paste is liquified and it, and its fiber loading, are redistributed around the mold to fill it up and form the desired molded article. In other word, the chunks of sheets of SMC represent a convenient way in which to add a liquifiable moldable material to the mold. This process is presently commercially practiced in a number of industries. Advantages of the process are the convenience of storing moldable mixture and the ease of loading a mold with the molding composition.

THE INVENTION

This invention relates to a thin, tacky film of incompatible in situ-expandable thermoplastic particles in a thermosettable matrix resin that contains an essentially uniform density and thickness across the breadth of the film. The invention is directed to a moldable in situ-expandable mass that is not pourable yet can be easily dispensed in a uniform manner within a mold and thereafter expanded without liquification to the dimensions of the mold. The in situ-expansion can be carried out without major redistribution of the mass to form a syntactic foam thermoset (cured) article with a predetermined density pattern.

This invention is directed to moldable, in situ-expandable, films comprising a mass of in situ-expandable thermoplastic particles of different expandabilities, uniformly distributed in a matrix thermosetting resin that is incompatible with the thermoplastic polymer of the in situ-expandable particles. This incompatibility exists throughout the thermal in situ-expansion cycle in forming the thermoset syntactic foam molded structure. During this cycle, the incompatible expandable thermoplastic particles sufficiently softens while at the same time expansion agents therein volatilize so as to reform the particles into hollow microsphere whose outer walls comprise the thermoplastic polymer, forming closed microcells. A significant advantage of the invention is the formation of thermoset syntactic foam films of uniformly distributed expanded closed-cell microspheres that have a density less than thermoset Syncore ® containing preformed microspheres (not in situ-formed), yet possesses comparable properties for replacing more expensive prepreg plies in stiffening critical structures.

This invention relates to a thin, uniform, tacky, non-pourable film of an incompatible mixture of in situ-expandable thermoplastic particles dispersed in a thermosettable matrix resin. The film can be accurately dispensed in a mold without pouring and, upon subjecting the dispensed films to heat, obtaining a cured syntactic foam. The invention also includes the ability to heat the dispensed film in the mold in a uneven manner to effect a thermal gradient in the mold and obtain a cured product having a density gradient throughout that is responsive to such thermal gradient. As a result of the invention, there may be obtained molded syntactic foam structures possessing stiffness and strength variability or uniformity depending on the end use application.

This invention is directed to a tacky and drapable, nonpourable film having a uniform ($\pm 10\%$, preferably $\pm 5\%$) thickness throughout, between about 1.5 millimeters to about 3.5 millimeters, that contains (i) a continuous phase of a thermosetting matrix resin system and (ii) a discontinuous phase of particles of a in situ-expandable thermoplastic polymer containing an expansion agent therein. Both (i) and (ii) are uniformly distributed throughout the film, so that upon expansion of the thermoplastic polymer into microcells in the film, the resulting film is a thermoset thin film syntactic foam the thickness of which is about 1.01 to about 4 times greater, preferably about 1.1 to about 3.5 times greater, than the non-expanded film. A feature of the non-pourable, tacky and drapable films is that while their thicknesses are uniform, the resultant cured syntactic foam may vary considerably in terms of density and thickness because of molding conditions. It is desirable that the thin, non-pourable, drapable non-expanded uniform film be capable, upon expansion by uniform application of heat throughout the film, while free of any confinement, form an expanded film of uniform ($\pm 10\%$, preferably $\pm 5\%$) thickness throughout.

A feature of the films of the invention is that the thermoplastic particle softens sufficiently for expansion at the temperature under which the thermosetting matrix resin undergoes cure. Since such thermosetting resins are curable to temperatures as high as 400° C., essentially all thermoplastic polymers are amenable for use as the thermoplastic particle component.

The invention allows the facile production of thermoset syntactic foams of unique conformance to and predetermined density within the molded volume of confinement. The "molded volume of confinement" means that mold space occupied by thermoset syntactic foams of the invention and physically encompassing the boundaries of the thermoset syntactic foam. The molded volume of confinement is restricted by metal mold surfaces encompassing the mold volume within which expansion of the nonpourable, tacky and drapable film occurs. The mold volume of confinement is also restricted by other materials to which the thermoset syntactic foam of the invention adheres in the molding operation, to form a composite structure. The other materials may be derived from thin metal films or foils (such as aluminum, steel, titanium, and the like), fabrics, prepregs, composites derived from molding prepregs, other fiber reinforced composites, preformed but uncured syntactic foams of other composition, and the like. In the typical case, expansion of the thin films of the invention fill the molded volume of confinement whereas the other materials occupy no more of the mold's interior before cure as they do after cure.

The invention encompasses a process as well as products. The process comprises defining a molded volume of confinement (the mold with or without other materials therein) and a thermoset syntactic foam density for the resulting molded thermoset syntactic foam. Then at least one layer of an amount of the non-pourable, tacky and drapable film having a uniform thickness, between about 1.5 millimeters to about 3.5 millimeters, that contains (i) a continuous phase of a thermosetting matrix resin system and (ii) a discontinuous phase of particles of a in situ-expandable thermoplastic polymer containing an expansion agent therein, is deposited and distributed in the mold to achieve the defined density. Both (i) and (ii) are uniformly distributed throughout the film, so that upon expansion of the thermoplastic polymer into microcells in the film, the resulting film is a thermoset thin film syntactic foam the thickness of which is about 1.01 to about 4 times greater, preferably about 1.1 to about 3.5 times greater, than the non-expanded film. It is possible to predetermine the uniformity of expansion and the resulting density of the thermoset syntactic foam because both (i) and (ii) are uniformly distributed throughout the film, so that upon expansion of the thermoplastic polymer into microcells, the resulting film is a thin film syntactic foam the thickness of which, as noted above, is greater than the non-expanded film. When sufficient energy is applied to the mold to advance the cure of the thermosetting matrix resin in the tacky and drapable film, to a temperature so as to sufficiently soften the thermoplastic particles and volatile the expansion agent therein, a syntactic thermoset foam is produced. The mold cycle is completed when the desired density is achieved. Then the resulting molded product encompassing the syntactic foam is withdrawn from the mold.

As noted above, the thin and drapable in situ-expandable tacky films may be composited with other materials. A simple and practical composite may be one which strengthens the film prior to expansion and conversion to the thermoset state. The non-pourable, thin, drapable tacky films can be handled without supporting material. However, to avoid premature curing of the film and to assist its handling, it may be cold stored like prepregs, usually at 0° F. (−17.7° C.) or below, and kept in that condition prior to use. Similar to the various Syncore ® materials, the films of the invention typically have a room temperature out-time that is much longer than the companion prepregs with which they would be molded. Because it is not cured, the film of the invention is tacky and very drapable when warmed to room temperature and is easier to lay-up than a comparable prepreg ply. It is desirable to make the film in supported forms with a lightweight scrim to prevent handling damage when it is frozen. In general, it will be desirable to affix the films to other, more durable thin layers that take handling better. For example, the non-pourable, thin, drapable, in situ-expandable films may be calendared to other layers, such as, to scrims, foils and plastic films. One convenient method of affixing handling materials to the films is to sandwich it between plastic films. Adhesion of the film to the handling material typically relies on its tackiness. If the handling material is an open scrim, such as a woven, nonwoven or knitted scrim, the drapability of the film assists bonding because the film sags about the individual fibers or filaments of the fabric, and will interbond through the opening in the scrim.

In addition, the films of the invention my be composited with a conventional syntactic foam that comprises thin films of uniform thickness which contain rigid preformed microballoons uniformly dispersed in a resin matrix. The syntactic foam composited with the in situ-expandable film may be any of the SynCore ® syntactic foams with which it would co-cure.

In another embodiment of the invention, the thin and drapable tacky films of the invention may be composited with a layer of a prepreg and the composite deposited in a mold for forming a product of the invention. In that case, the prepreg/thin and drapable tacky film composite can be laid up in a mold in a variety of configurations to form a lightweight thermoset composite having good strength and stiffness.

In a further embodiment of the invention, the thin and drapable tacky film of the invention may be composited with more than one layer of material. In particular, the composite may comprise a layer of the handling material and at least one layer of another material such as a preformed syntactic foam layer or a prepreg layer, or a combination of the two. Alternatively, the composite may comprise at least two layers of handling material, such as a layer of scrim and a layer of foil or two layer of foil or one layer of scrim and two layers of foil, or one layer of scrim and one layer of plastic, and the like.

A highly preferred embodiment of the invention comprises a thin and drapable tacky film comprising a mass of staple thermoplastic fibers and expandable thermoplastic non-fibrous particles uniformly distributed in a non-pourable matrix containing a thermosetting resin that is incompatible with the thermoplastic polymer of the fibers and the expandable particles. The thermoplastic fibers have a $T_m$ or $T_g$ that is greater than the cure temperature of the matrix resin. The thermoplastic polymer of the expandable particles soften at a temperatured which is less than the cure temperature of the matrix resin. This fiber reinforced film preferably contains the fibers oriented in a direction primarily essentially parallel to the film's surface. When the film is expanded into a syntactic foam, the fibers may be caused to concentrate at the surface to form a tough, abrasion resistent surface. This embodiment, in general, forms molded syntactic foams that possess unique surface abrasion resistence when compared with other syntactic foams. This embodiment provides syntactic foams suitable for aerospace applications, where the material needs to be tough to withstand erosion forces or impaction yet be lightweight, a universal requirement in aircraft applications.

An interesting embodiment of the invention involves scrolling the non-pourable, thin, drapable film, preferably while adhered to a scrim layer, into small diameter tubes about which are adhered prepreg layers containing carbon fiber reinforcement to form a composite tube containing a small hole in the center. Such composite tubes, when viewed cross-sectionally, have a donut appearance. When the tube is cured, the hole in the interior may be fully or partially filled with the expanded syntactic foam to provide a stiff inner core, along the lines described in U.S. Pat. No. 4,968,545, patented Nov. 6, 1990.

DETAILED DESCRIPTION OF THE INVENTION

Figure 1:
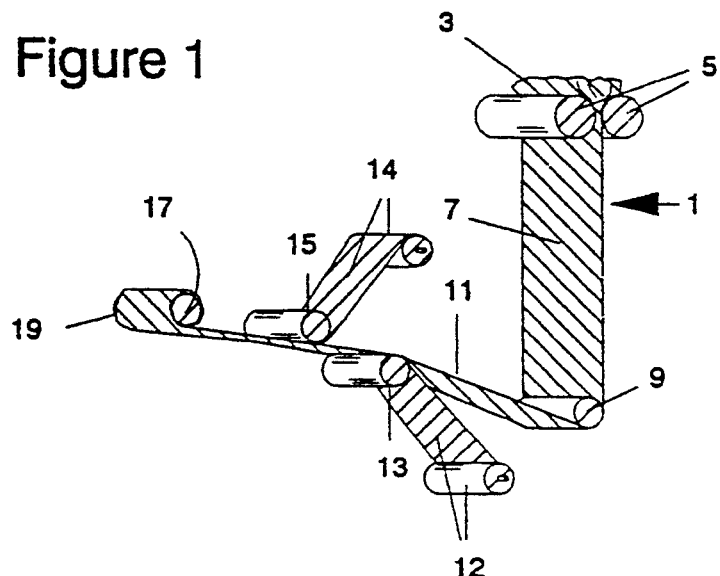
FIG. 1 is a schematic perspective (partially isometric) illustration of a calendaring system by which to make the in situ-expandable thin films of the invention.

As note previously, syntactic foam films, such as Syncore ®, are typically used in stiffness critical applications. The bending stiffness of a structure is proportional to the third power of thickness ($T^3$). A relatively slight fluctuation in thickness will result in a significantly large variation in stiffness. That art teaches us that controlling the film thickness is a crucial manufacturing parameter in making a molded composite structure from syntactic foams.

Space volume (foam cells) in thin uniform syntactic foam films such as Syncore ® is achieved by substituting light hollow microspheres for the relatively dense matrix resin on a volume to volume basis. The amount of space volume that can be achieved is limited by a physical barrier and a process obstacle.

The physical barrier occurs at maximum packing fraction. Recognizing that the objective involves packing spheres into a fixed volume, maximum packing occurs when point-to-point contacts are developed between adjacent/nearest packing spheres. Beyond this point, it is physically impossible to pack any additional spheres into this fixed volume. For monodispersed spheres, this represents about 64% of the packing volume. In commercially available multi-dispersed sphere systems, the weight reduction is limited by the particular system's packing fraction.

From a processing standpoint, adding glass microspheres to a matrix resin increases resin viscosity, similar to that of adding fillers or thixotropic agents to the resin. This viscosity increase is due to an interaction between the flowing resin and the surface of the sphere. In simplistic terms, as the resin moves past a sphere, it imparts an equal and opposite drag force on the surface of the sphere and develops a shear stress through the center of the sphere. Typically, the shear strength of hollow spheres is low and during processing the resin's viscosity increases proportionally to the volume of hollow spheres added. As a result of the proportional increase in shear stress caused by the resin's increased viscosity, sphere damage/fracture occurs. This shear stress is the primary cause of sphere damage/fracture during processing. Once the spheres are damaged, the weight saving advantage from the use of hollow spheres is negated.

This invention establishes that these sphere related limitations are avoided by the use of expandable thermoplastic particles to in situ generate microspheres from a thin film to produce a thin (albeit thicker) syntactic foam film. These in situ-expandable thermoplastic particles possess behavior and processing characteristics similar to pigments and fillers. The average particle size of the thermoplastic in situ-expandable particles are typically an order of magnitude, or more, smaller than the pre-expanded hollow sphere used in commercial thin film syntactic foams. For example, for a given volume, a significantly greater number of unexpanded particles may be added to a given volume of resin compared to the pre-expanded spheres. Since expansion takes place in situ during the cure step, the shear sensitivity of pre-expanded hollow spheres does not become a problem.

The packing of the expanded spheres is also more efficient because of in situ-expansion. During cure, the matrix resin's viscosity, even though non-pourable at normal handling temperatures, such as at about room temperature (about 15°–37° C.) or conventional handling temperatures (which can vary from application to application), decreases with increasing temperature and since the unexpanded spheres are not in a point-to-point contact configuration, their environment is mobile and this allows each particle to expand within the film. This mobility results in a more densely microsphere-packed lattice. However, in the general practice of the invention, the film will be cut to the size of the mold. As a result, because the expansion forces are three-dimensionally directed, this mobility is initially primarily in the upwardly z direction rather than in the laterally xy direction. As expansion takes place, the film's edge surfaces enlarge, so they expose more particles to heat through the edge surfaces. As a result, more of the particles at the edge surfaces initiate expansion so that a greater proportion of the particles continue to expand in the z direction.

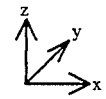

The upward expansion is further magnified by having the film placed in the mold such that the edges of the film abut or essentially abut the wall or walls of the mold. The free expansion of the particles into microspheres is inhibited by the confining walls so that the internal expansion forces in the particles at the walls are directed more in the z direction initially. One might expect that the edges of the film would rise to greater heights in an otherwise vertical free expansion, but this is not the typical case. Free vertical expansion of the film results in a generally uniform rise of the film. This means that the surfaces of the expanded film which eventually contact the walls of mold are essentially uniform in thickness resulting in a molded product of exceptional uniformity both in density but also in surface skin thickness at the edges and surfaces.

The film of the invention can be made in a number of ways and with a variety of resin systems to achieve the advantages herein set forth. The formulation of the film will be dictated by the specific end-use application of the film and the resultant molded syntactic foam, as well as the method employed in making the film. Therefore, it is not intended that this description should be limited to any specific application and to any specific formulation and process of manufacture.

The thermosetting matrix resin suitable for use in the invention comprise those typically used in the manufacture of Syncore ® syntactic foam. For example, epoxies curing at 350° F. (177° C.) and 250° F. (121° C.) are the most common matrix resins, but matrices of bismaleimide (BMI), phenolic, polyester, PMR-15 polyimide and acetylene terminated resins that have been used to produce SynCore ® products, are usable in the practice of the invention. However, the invention includes as well, other thermosetting resins; indeed, the invention includes the family of thermosetting resins. For example, thermosetting resins from acrylics, polyurethanes, free-radically induced thermosetting resin, and the like, may also be used in the practice of the invention. As a restfit of such considerable choices in thermosetting resins, the thin in situ-expandable films of the invention are tailorable to making syntactic foams for a wide variety of applications.

Preferably, the invention embraces the use of thermosetting resins that find use in adhesive applications thereby providing the desired tackiness to the film. Such allows the thin film to be applied conveniently to any substrate and by virtue of the drapability of the film, have the film cling to the substrate throughout processing and cure, and configure to the substrate.

As noted, the thin film is non-pourable and tacky. This condition can be achieved in a number of ways. Many thermosetting resins are solids at about 23° C. and many of them are liquids at this temperature. Both kinds of resins can be made non-pourable and tacky. For example, a resin which is solid and a resin which is liquid can be combined to form a mixed resin system Illustrations of suitable epoxy resins include, e.g., one or more of diglycidyl ethers of bisphenol A (2,2-bis(4-hydroxyphenyl)propane), such a those of the following formula:

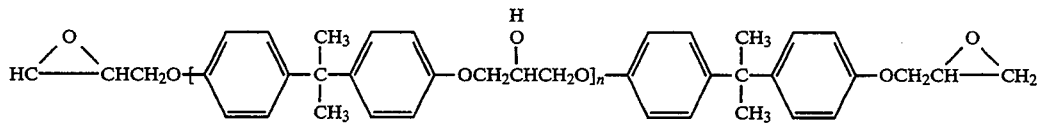

that is non-pourable and tacky. In addition, a solid or liquid thermosetting resin can have incorporated in it a variety of diverse materials which will render the resin non-pourable at conventional handling temperature conditions and non-pourable and tacky at room temperature (about 15°–37° C.). Conventional handling temperatures are defined as a temperature of between about −20° C. to about 43° C.[2]

[2]. This range reflects the fact that material handling can require low temperature storage to preclude premature reaction of the thermosetting resin system and relatively high temperatures because the film may be used on a hot factory floor.

Though the in situ-expandable thermoplastic particles will render a liquid thermosetting resin more viscous, they alone are not effective for making the film non-pourable. If the thermosetting resin is solid, it can be calendared into a film by melting the resin with heat under conditions that avoid condensation or addition of the resin to a thermoset condition (C-stage). If the resin is a liquid, it can be blended with thixotropic agents, other solid resins and/or liquid or thermoplastic elastomeric modifiers to convert the resin from a liquid to a non-pourable and tacky material.

The typical thermosetting resin is an A-stage resin. In some cases, it may be desirable to utilize a B-stage resin but in the typical case, such is done in combination with an A-stage resin. Such B-stage resin will affect the viscosity of the resin formulation but they are not relied on to achieve the level of non-pourability for the most effective operation of the invention.

A preferred class of thermosetting resin in the practice of the invention are the epoxy resins. They are frequently based, inter alia, on one or more of diglycidyl ethers of bisphenol A (2,2-bis(4-hydroxyphenyl)propane) or sym-tris(4-hydroxyphenyl)propane, tris(4-hydroxyphenyl)methane, their polyepoxide condensation products, cycloaliphatic epoxides, epoxy-modified novolacs (phenol-formaldehyde resins) and the epoxides derived from the reaction of epichlorohydrin with analine, o-, m- or p-aminophenol, and methylene dianaline.

The epoxy resins suitable in the practice of the invention include the various established thermosetting epoxy resins conventionally employed in making prepregs, especially carbon and graphite fiber reinforced prepregs. It is desirable that the epoxy resin be a low or lower viscosity version to facilitate film formation.

or sym-tris(4-hydroxyphenyl)propane or tris(4-hydroxyphenyl)methane, their polyepoxide condensation products, cycloaliphatic epoxides, epoxy-modified novolacs (phenol-formaldehyde resins) of the formula:

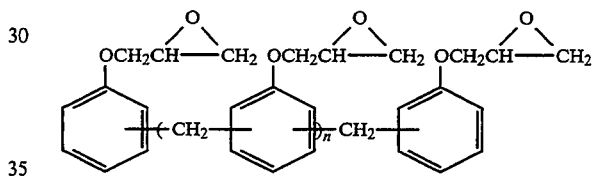

wherein n is 0–1.8, preferably 0.1–0.5.

Other epoxy resins may be combined with the above epoxy resins or used alone. They include, e.g., 3,4-epoxy cyclohexyl methyl-3,4-epoxy cyclohexane carboxylate, vinyl cyclohexene dioxide, 2-(3,4-epoxy cyclohexyl-5,5-spiro-3,4-epoxy) cyclohexane-meta-dioxane, bis (3,4-epoxy cyclohexyl) adipate, and the like.

The epoxy resins of the invention are combined with hardeners which cure the resin to a thermoset condition. The preferred hardeners are amine compounds, ranging from dicyandiamide, to ureas, to aliphatic and aromatic amines. A preferred class of hardeners are the aromatic amines encompassed by the formula:

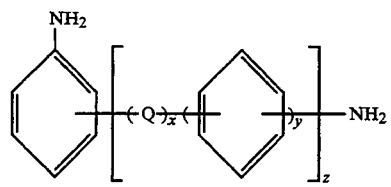

Q is one or more of a divalent group such as —SO$_2$—, —O—, —RR'C—, —NH—, —CO—, —CONH—, —OCONH—, and the like, R and R' may each independently be one or more of hydrogen, phenyl, alkyl of 1 to about 4 carbon atom, alkenyl of 2 to about 4 carbon atoms, fluorine, cycloalkyl of 3 to about 8 carbon atoms, and the like, x may be 0 or 1, y may be 0 or 1 and is 1 when x is 1, and z may be 0 or a positive integer, typically not greater than about 5.

Preferred hardeners are diamines of the formula:

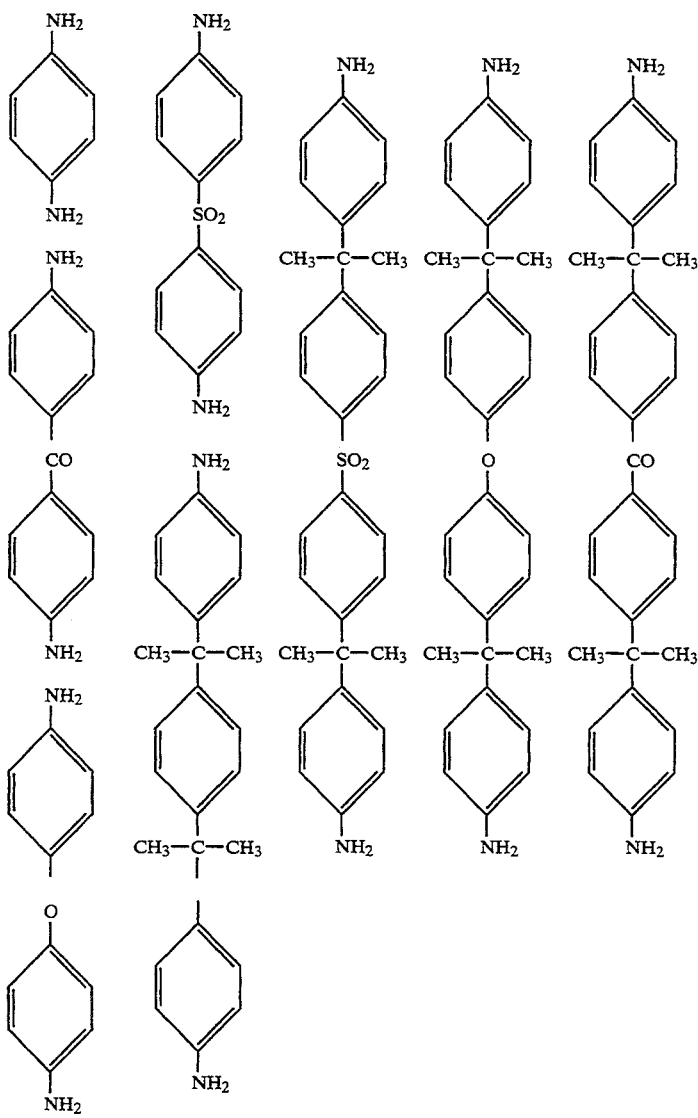

Another preferred class of hardeners are the aliphatic amines such as the alkyleneamines. Illustrative of suitable alkyleneamines are the following:

monoethanolamine
ethylenediamine
N-(2-aminoethyl)ethanolamine
Diethylenetriamine
Piperazine
N-(2-aminoethyl)piperazine
Triethylenetetramine
Tetraethylenepentamine
Pentaethylenehexamine
Diaminoethylpiperazine
Piperazinoethylethylenediamine
4-Aminoethyltriethylenetetramine
Tetraethylenepentamine
Aminoethylpiperazinoethylethylenediamine
Piperazinoethyldiethylenetriamine Another class of hardeners, but which can also be used as extender of the epoxy resin, are the higher molecular weight poly(oxyalkylene)polyamines such as those of the following formulas:

where y is 2–40

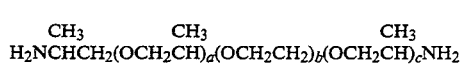

where a+c is about 2.5 and b is 8–45.

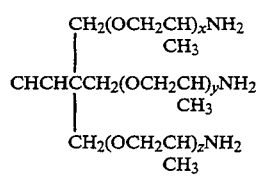

where x, y and z range from about 2–40

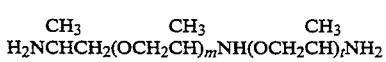

where m+t is about 82-86.

The hardener may be a monoamine such as aniline, paraaminophenol, and alkylated versions of them.

A further class of desirable hardeners are the reaction products of dialkylamines, such as dimethylamine, diethylamine, methylethylamine, di-n-propylamine, and the like, with a variety of mono and diisocyanates to form mono and diureas. Any of the polyisocyanates listed below my be so reacted for use as a hardener. Specific illustration of useful hardeners are those encompassed by the following formulas and descriptions:

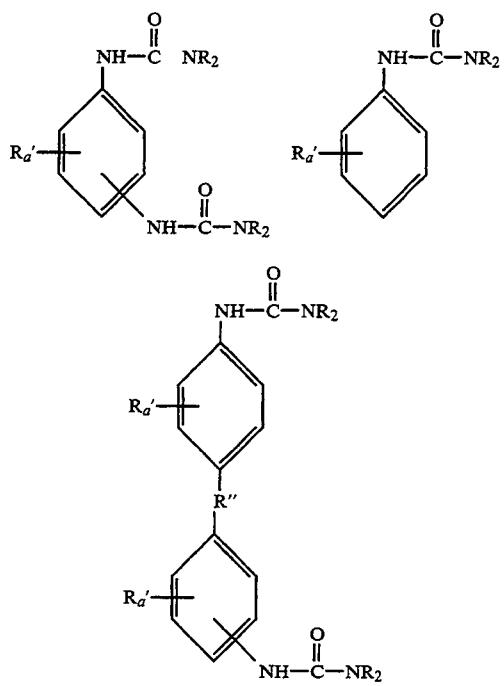

where R is a monovalent organic group; R' is alkyl, halo, alkoxy, and the like; R" is methylene, isopropylidene, ethylidene, or a covalent bond; and a is 0–4.

Preferred urea hardeners are those that are the reaction products of dimethylamine with mixtures of 80% 2,4-tolylene diisocyanate and 20% 2,6-tolylene diisocyanate, polymeric isocyanate, p-chlorophenylisocyanate, 3,4-dichlorophenylisocyanate or phenylisocyanate.

The amount of the hardener employed is usually stoichiometrically equivalent on the basis of one amine group per epoxy group in the resin. If the epoxide is a triepoxide and the hardener is a diamine, then the molar ratio of hardener to epoxide would typically be about 2.5/3 or 0.83. A typical formulation would have a weight ratio of epoxy resin to hardener of about 3/2 to about 4/1. Where any of the hardeners serve primarily as extenders of the epoxide resin, then the amount of the hardener in the typical case will be less than that generally employed for hardening the epoxide. Mixtures the above hardeners and with other hardeners are within the contemplation of this invention.

Other reactive resin systems include the various thermosetting or pthermosettable resins include the bismaleimide (BMI), phenolic, polyester (especially the unsaturated polyester resins typically used in SMC production), PMR-15 polyimide and acetylene terminated resins are also suitable.

The urethane systems represent a typical non-engineering polymer for applications demanding less performance than, for example, the epoxy resin systems. They typically comprise the reaction of a polyisocyanate, a polyol, alone or with another active hydrogen compound, typically in the presence of a catalyst, such as an amine catalyst. However, in the practice of this invention, the polyurethane is a mixture of a blocked polyisocyanate, such as the reaction product of a mono-ol or monohydroxy phenolic compound with a polyisocyanate that is an organic polyisocyanate. This includes an organic compounds that contain at least two isocyanato groups and include the hydrocarbon diisocyanates (e.g., the alkylene diisocyanates and the arylene diisocyanates), as well as known triisocyanates and polymethylene poly(phenylene isocyanates).

The blocked isocyanates are compounds of the formula:

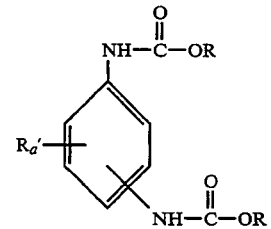

where R is a monovalent organic group; R' is alkyl, halo, alkoxy, and the like; and a is 0–4.

Illustrative polyisocyanates for use in making the blocked isocyanates are:

| | |
|---|---|
| 2,4'-diisocyanatotoluene | 2,6-diisocyanatotoluene |
| methylene bis(4-cyclohexyl isocyanate) | 1,2-diisocyanatoethane |
| 1,3-diisocyanatopropane | 1,2-diisocyanatopropane |
| 1,4-diisocyanatobutane | 1,5-diisocyanatopentane |
| 1,6-diisocyanatohexane | bis(3-isocyanatopropyl)ether |
| bis(3-isocyanatopropyl) sulfide | 1,7-diisocyanatoheptane |
| 1,5-diisocyanato-2,2-dimethylpentane | 1,6-diisocyanato-3-methoxyhexane |
| 1,8-diisocyanatooctane | 1,5-diisocyanato-2,2,4-trimethypentane |
| 1,9-diisocyanatononane | 1,10-disocyanatopropyl)ether |
| | of 1,4-butylene glycol |
| 1,11-diisocyanatoundecane | 1,12-diisocyanatododecane |
| | bis(isocyanatohexyl) sulfide |
| 1,4-diisocyanatobenzene | 2,4-diisocyanatotolylene |
| 2,6-diisocyanatotolylene | 1,3-diisocyanato-o-xylene |
| 1,3-diisocyanato-m-xylene | 1,3-diisocyanato-p-xylene |
| 2,4-diisocyanato-1-chlorobenzene | 2,4-diisocyanato-1-nitrobenzene |
| 2,5-diisocyanato-1-nitrobenzene | 4,4-diphenylmethylene diisocyanate |
| 3,3-diphenyl-methylene diisocyanate | polymethylene poly (phenyleneisocyanates) |

| isophorone diisocyanate | and mixtures thereof. |

The preferred polyisocyanates are mixture of 80% 2,4-tolylene diisocyanate and 20% 2,6-tolylene diisocyanate and polymeric isocyanate. The blocked isocyanates comprise any of the above polyisocyanates reacted with a monofunctional hydroxy containing compound. The resultant blocked polyisocyanate is unreactive towards hydroxyl compounds at room temperature pbut, at elevated temperatures, will function as an isocyanate to crosslink the hydroxyl compounds to form the thermoset resin. For example, an adduct of tolylene diisocyanate and trimethylolpropane is first prepared in solution, followed by the addition of phenol to block the remaining isocyanate groups. Illustrative of such a blocked polyisocyanate is a phenol blocked toluene diisocyanate in cellosolve acetate sold by Mobay Chemical Co., as Mondur S. Such blocked isocyanates, when mixed with the polyols, provide a thermosetting polyurethane matrix resin that can form a tacky thin in situ expandable film that is storable and curable on demand, in accordance with the invention.

The polyols used in forming the polyurethane may be an organic diol, triol, tetraol, pentaol, and the like. Illustrative are the following compounds: ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,3-propanediol, and the like; or formed from by the alkoxylation of a starter polyol, such as the class of polyols characterized; or formed from reaction of the above diols, triols, etc., with caprolactone. The resulting ester polyols ("Tone's") are widely used in reactions with isocyanate. Desirable alkoxylated polyols are alkylene oxide adducts of a hydroxylated alcohols of the formula:

and preferably a "starter" diol, triol, tetraol and higher hydroxylated alcohols, of the formula:

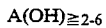

wherein A is a polyvalent organic moiety, the free valence of which is 2–6 or greater, or an average value equal thereto, as the case may be.

Illustrative of suitable compounds embraced by the "starter" $A(OH)_{\geq 2-6}$ alcohol are the following: ethylene glycol, diethylene glycol, 1,2-propylene glycol, polyethylene glycol, polypropylene glycol, glycerine, pentaerythritol, sorbitol, diether of sorbitol, mannitol, diether of mannitol, arabitol, diether or arabitol, sucrose, mixtures thereof, and the like.

The starter $A(OH)_{\geq 2-6}$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimato molecular weight of the alkoxylated polyol adduct. The molecular weight of the alkoxylated polyol adduct should be relatively high, preferably above about 4000 (number average) and, more preferably, above about 5000. The minimum molecular weight of the alkoxylated polyol adduct may be about 2000. The preferred 1,2-alkylene oxides are lower 1,2-alkylene oxides, such as ethylene oxide, 1,2-propylene oxide, 1,2-butylene oxide, and the like. The resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art. Adduct reactions may be base or acid catalyzed, with base catalyzation preferred.

The organic polyol may be a polyester polyol, such as a polyester of a dicarboxylic acid, acid halide or anhydride and a polyol, such as those characterized above. In this case, it is desirable to allow the polymer to be hydroxyl terminated, and conventional procedures in the art are useful for this purpose. A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane.

Polyester resins usable as the thermosetting matrix resin, are typically reaction products of a dicarboxylic acid, acid halide or anhydride, with a polyhydric alcohol. The dicarboxylic acids or anhydrides that are employed to produce the polyester, either singly or in combination, include those that contain olefinic unsaturation, preferably wherein the olefinic unsaturation is alpha, beta- to at least one of the carboxylic acid groups, saturated paliphatic, heteroaliphatic and aromatic polycarboxylic acids, and the like. Such acids include maleic acid or anhydride, fumaric acid, methyl maleic acid, and itaconic acid (maleic acid or anhydride and fumaric acid are the most widely used commercially), saturated and/or aromatic dicarboxylic acids or anhydrides such as phthalic acid or anhydride, terephthalic acid, hexahydrophthalic acid or anhydride, adipic acid, isophthalic acid, and "dimer" acid (i.e., dimerized fatty acids). They may be cured by providing a polymerization initiator and low viscosity crosslinking monomers in the formulation. Where the resin is a unsaturated polyester or vinyl ester, it is preferred that the monomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as α-methyl styrene, α-chlorostyrene, 4-methylstyrene, and the like, divinylbenzene, acrylonitrile, methacrylonitrile, and the like. Styrene is the preferred monomer in commercial practice today, although others can be used. Suitable polymerization initiators include t-butyl hydroperoxide, t-butyl perbenzoate, benzoyl peroxide, cureerie hydroperoxide, methyl ethyl ketone peroxide, and others known to the art. The polymerization initiator is employed in a catalytically effective amount, such as from about 0.3 to about 2 to 3 weight percent, based on the weight of polyester and the crosslinking monomer.

When desired, a thickening agent can also be employed in the polyester thermosetting compositions. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide and the like, including mixtures of the same. Thickening agents are normally employed in proportions of from about 0.1 to about 6 weight percent, based upon weight of the polyester resin and crosslinking monomer.

Particularly desirable materials for rendering the thermosetting resin non-pourable are thixotropic agents and/or elastomer-type polymers that provide discrete elastomer phases (second phases) in the thermosetting resin matrix. Certain of these material may reduce, to some finite degree, the crosslinking density of the thermoset resin (C-stage). Many of these materials introduce very favorable properties to the resulting thermoset resin. For example, a partially desirable material for this purpose, is an elastomeric polymer containing soft and hard segments, the hard segments acting like or forming on processing, crosslinking of the elastomeric type. Some of these elastomeric types contain functional end groups which allow it to couple with complementary functional monomers or polymers to form the desired elastomer in situ of the thermosetting resin and render it non-pourable and tacky, while toughening the cured resin. As a class, these elastomeric polymers act or are crosslinked yet are thermoprocessable, which when discretely provided in the matrix resin renders the resin non-pourable and tacky, and also toughens it.

One class of suitable elastomer-type thermosplastic ABS (acrylonitrile-1,4-butadiene-styrene) block copolymers that are typically used as modifiers of other resin systems. They are characterized as having a wide range of properties though the preferred systems of the invention utilize copolymers that are high rubber types that, when compared to other copolymers of this type, have a relatively low tensile strength, low tensile modulus, higher impact resistance, low hardness and heat deflection temperature. Another elastomer that is found desirable are the carboxyl and amine terminated liquid butadiene acrylonitrile copolymers. Such copolymers may contain pendant carboxyl groups in the interior of the polymer structure through the inclusion of methacrylic or acrylic acid in the polymerization or through the hydrolysis of some of the pendant nitrile units. Such polymers react with the epoxy resin and as a result, the epoxy forms the hard segment generating the elastomer properties.

Another class of block thermoplastic elastomers are Kraton TM, available from Shell Chemical Company. These thermoplastic rubber polymers possess usable thermoplastic properties. They can be softened and they flow under heat and pressure. They then recover their structures on cooling. The chemical make-up are of three discrete blocks of the linear or A-B-A type. They are available as styrene-butadiene-styrene (S-B-S) block copolymers, styrene-isoprene-styrene (S-B-S) block copolymers and styrene-ethylene/butylene-styrene (S-EB-S) block copolymers. They are characterized by styrene polymer endblocks and an elastomeric midblock. After processing, the polystyrene endblocks physically crosslink, locking the rubber network in place. This physical crosslinking is reversible on heating.

Another series of the Kraton TM thermoplastic rubbers are the diblock polymers in which one block is a hard thermoplastic and the other is a saturated soft elastomer. Illustrative of this series is Kraton TM G 1701, a diblock polymer of a hard polystyrene block and a saturated, soft ppoly(ethylene-propylene) block.

Other rubbers or elastomers include: (a) homopolymers or copolymers of conjugated dienes having a weight average molecular weight of 30,000 to 400,000 or higher as described in U.S. Pat. No. 4,020,036, in which the conjugated dienes contain from 4–12 carbon atoms per molecule such as 1,3-butadiene, isoprene, and the like; (b) epihalohydrin homopolymers, a copolymer of two or more epihalohydrin monomer, or a copolymer of an epihalohydrin monomer(s) with an oxide monomer(s) having a number average molecular weight ($M_n$) which varies from about 800 to about 50,000, as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene/norbornadiene, as described in U.S. Pat. No. 4,161,471; (e) conjugated diene butyl elastomers, such as copolymers consisting of from 85 to 99.5% by weight of a $C_4$–$C_7$ isolefin combined with 15 to 0.5% by weight of a conjugated multi-olefin having 4 to 14 carbon aroma, copolymers of isobutylene and isoprene where a major portion of the isoprene units combined therein have conjugated diene unsaturation as described in U.S. Pat. No. 4,160,759.

Specific illustrations of suitable elastomeric polymers are the following:

1. Hycar TM CTBN liquid reactive rubbers, carboxyl terminated butadiene-acrylonitrile copolymers sold by B. F. Goodrich.
2. Hycar TM CTBNX, similar to CTBN except that they contain internal pendant carboxyl groups, also supplied by B. F. Goodrich.
3. Hycar TM ATBN, amine terminated butadiene-acrylonitrile copolymers sold by B. F. Goodrich.
4. K 1102-28:72 styrene:butadiene linear SBS polymer, available from Shell Chemical Company under the registered trademark "Kraton" 1102.
5. KDX 1118-30:70 styrene:butadiene copolymer containing 20% SBS triblock and 80% SB diblock, available from Shell Chemical Company under the registered trademark "Kraton" DX 1118.
6. KG 1657-14:86 styrene:ethylene-butylene:styrene copolymer available from Shell Chemical Company under the registered trademark "Kraton" G1657.
7. S 840 A-Stereospecific 43:57 styrene-butadiene SB rubber available from Firestone Synthetic Rubber & Latex Company under the registered trademark "Stereon" 840A.
8. SBR 1006-random 23.5:76.5 styrene:butadiene SB block copolymer rubber available from Goodrich Chemical Company under the registered trademark "Ameripol" 1006.
9. SBR 1502-Random 23.5:77.5 styrene:butadiene rubber available from Hules Mexicanos, or from Goodrich Rubber Company as "Ameripol" 1502.
10. Cycolac TM Blendex modifier resins (e.g., 305, 310, 336 and 405)-ABS polymers sold by Borg-Warner Chemicals, Inc. Different varieties are available and their suitability depends on the properties sought.

Illustrative of thixotropic agents that can render a thermosettable resin non-pourable are high surface area fumed silicas and organosilyl blocked fumed silicas, and the like.

The thermoplastic polymer used in forming the in situ-expandable thermoplastic particles are readily prepared from a wide variety of materials. A number of patents refer to their manufacture. For example, U.S. Pat. No. 3,615,972 describes their preparation by polymerizing the monomer of an aqueous dispersion of (1) organic monomeric materials suitable for polymerization to a thermoplastic resinous material having the desired physical properties, (2) a liquid blowing or raising agent which exerts a little solvent action on the resulting polymer, and in a quantity in excess of that which is soluble in the polymer, and (3) a dispersion stabilizing material which is utilized to maintain the dispersion. The resulting solid spherical particles have a quantity of the liquid-blowing agent encapsulated in them as a distinct and separate phase.

The thermoplastic polymers are formed by the polymerization of one or more of a variety of different types of alkenyl monomers, such as those of the formula:

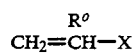

$$CH_2=CH-X$$

p to form homopolymers or copolymers, such as random or ordered (including block) copolymers. In the above formula, $R^o$ may be alkyl, such as methyl, ethyl and the like, or halogen, such as chlorine, fluorine, bromine or iodine, and X may be an aromatic containing moiety bonded via an aromatic carbon atom, a carbonyl oxy ester moiety, halogen, cyano, oxycarbonyl ester, carboxyl, and the like. Illustrative of these monomers are those in which X is aromatic containing, such as styrene, o-methylstyrene, m-methylstyrene, p-methylstyrene, ethylstyrene, ar-vinyl-xylene, ar-chlorostyrene, ar-bromostyrene, vinylbenzylchloride, p-tert.-butylstyrene, and the like. Also illustrative of these monomers are those in which X is a carbonyl oxy ester moiety to form acrylate monomers alone or in combination with the alkenyl aromatic monomers may also be utilized. Such acrylate-type monomers include methyl methacrylate, ethyl acrylate, propyl acrylate, butyl acrylate, butyl methacrylate, propyl methacrylate, butyl methacrylate, lauryl acrylate, 2-ethyl hexyl acrylate, ethyl methacrylate, and the like. X and $R^o$ may be a halogen, such as chlorine, fluorine, bromine and iodine, thereby to encompass the formation of copolymers of vinyl chloride and vinylidene chloride, acrylonitrile with vinyl chloride, vinyl bromide, and similar halogenated vinyl compounds. X may be a cyano group and this includes polymers of acrylonitrile and methacrylonitrile. When X is an oxycarbonyl esters, such as the vinyl esters, such as, vinyl acetate, vinyl butyrate, vinyl stearate, vinyl laurate, vinyl myristate, vinyl propionate, and the like, are suitable polymeric components. One may also employ for specific purposes ethylenically unsaturated copolymerizable acids such as acrylic acid, methacrylic acid, itaconic acid, citraconic acid, maleic acid, fumaric acid, vinylbenzoic acid, and the like.

The thermoplastic polymers may also include copolymers (of the random or ordered varieties, especially blocked copolymers) of the monomers described above with a variety of hydrocarbon monomers, such as propylene, butene, and one or more dienes, such as:

straight chain acyclic dienes such as: 1,4-hexadiene, 1,6-octadiene, and the like;

branched chain acyclic dienes such as: 5-methyl-1,4-hexadiene, 3,7-dimethyl-1,6-octadiene, 3,7-dimethyl-1,7-octadiene and the mixed isomers of dihydromyrcene, dihydroocinene, and the like;

single ring alicyclic dienes such as: 1,4-cyclohexadiene, 1,5-cyclooctadiene, 1,5-cyclododecadiene, and the like;

multi-ring alicyclic fused and bridged ring dienes such as: tetrahydroindene, methyltetrahydroindene, dicyclopentadiene, bicyclo-(2,2,1)-hepta-2,5-diene, alkenyl, alkylidene, cycloalkenyl and cycloalkylidene norbornenes such as 5-methylene-2-norbornene (MNB), 5-ethylidene-2-norbornene (ENB), 5-propyl-2-norbornene, 5-isopropylidene-2-norbornene, 5-(4-cyclopentenyl)-2-norbornene, 5-cyclohexylidene-2-norbornene, and the like.

The thermoplastic polymer used in forming the in situ-expandable thermoplastic particles may also be made from condensation type polymers, such as nylon-6,6; nylon-6; nylon-4,6; polyester from polyethylene terephthalate; Kevlar TM polyaramide; polycarbonates (viz., poly (2,2-bis(1.4-oxyphenyl) propane carbonate)); polyarylates (viz., poly (2,2-bis(1.4-oxyphenyl) propane terephthalate); polyimides; polyetherimides, such as Ultem TM [3]; polysulfones (see U.S. Pat. Nos. 4,175,175 and 4,108,837), such as Udel TM and Radel TM A-400[4]; the polyethersulfones (see U.S. Pat. Nos. 4,008,203, 4,175,175 and 4,108,837), such as Victrex TM PES[5]; polyarylsulfones; polyarylamideimides, such as Torlon TM [6]; and the like.

[3]. Available from General Electric Company Company, Plastics Business Group, Pittsfield, Mass. 4. Manufactured by Amoco Performance Products Inc., Ridgefield, Conn. 5. Available from ICI Advanced Materials, Wilmington, Del. 19897 6. Available from Amoco Chemical Company, Chicago, Ill.

A wide variety of blowing or raising agents may be incorporated within the polymerization system. They can be volatile fluid-forming agents such as aliphatic hydrocarbons including ethane, ethylene, propane, propylene, butene, isobutylene, neopentane, acetylene, hexane, heptane, or mixtures of one or more such aliphatic hydrocarbons having a molecular weight of a least 26 and a boiling point below the range of the softening point of the resinous material when saturated with the particular blowing agent utilized.

Other suitable fluid-forming agents are the chlorofluorocarbons such as those described in U.S. Pat. No. 3,615,972 (column 4, lines 21–30) and tetraalkyl silanes such pas tetramethyl silane, trimethylethyl silane, trimethylisopropyl silane and trimethyl-n-propyl silane. As pointed out in this patent, the boiling point of such foaming agents at atmospheric pressure should be about the same temperature range or lower than the softening point of the resinous material employed.

As pointed out in U.S. Pat. No. 4,397,799, patented Aug. 9, 1983, the particle size of the unexpanded particles, as well as the expanded microspheres can vary widely. Particle sizes for the unexpanded particles can range, for example, from about 1 μm to about 1 mm, preferably from about 2 μm to about 0.5 mm. One version of in situ-expandable particles are sold under the name Expancel ®, by Nobel Industries Sweden, Sundsvall, Sweden (U.S. address: Marrietta, Ga. 30062). They range in unexpanded particle size from about 5 μm to about 50 μm. The particle diameters expand 2 to 5 times.

Blowing agents such as the Freons ®, such as trichlorofluoromethane, hydrocarbons such as n-pentane, i-pentane, neo-pentane, butane, i-butane, azodicarbonamide are commonly suggested blowing agents found in these types of in situ-expandable particles. Typically, the unexpanded particles contain from about 3 to about 40 weight % blowing agent.

Preferably, the particles used have a mixed particle size of wide spread to achieve the best packing, on expansion, in the syntactic molded foam. A particularly preferred in situ-expandable particle is Expancel ® 091 DU, which is believed to be a terpolymer of vinylidene chloride, acrylonitrile and methacrylonitrile containing 10–18 weight % isopentane, and possesses the following properties: average unexpanded particle size of about 12 $\mu$m with a spread of about 5–50 $\mu$m, true density (expanded in water at 100° C., kg/m), <20; TMA-T(start) ° C., 125–130; T(max) ° C., ~183; TMA-density,kg/m$^3$, <17.

As noted above, the thin film may contain fibers. Such fibers provide toughness properties to the molded syntactic foam product. Fibers that may be used in the practice of the invention may be any organic fiber that has a melting temperature ($T_m$) greater than the cure temperature of the matrix resin in making the expanded molded syntactic foam. Also usable in the practice of this invention are fibrous type of structures, having a length greater than diameter, that are made of amorphous polymers. For example, certain polysulfone fibers having a high $T_g$ may be employed. In such a case, the polymer's $T_g$ should be greater than the cure temperature of the matrix resin. Suitable fibers may be made from any of the performance and engineering plastics. For example, the fibers may be made from nylon-6,6; nylon-6; nylon-4,6; polyester from polyethylene terephthaiate; polypropylene; Kevlar ® polyaramide; polycarbonates (viz., poly (2,2-bis(1.4-oxyphenyl) propane carbonate)); polyarylates (viz., poly (2,2-bis(1.4-oxyphenyl) propane terephthalate); polysulfides (see U.S. Pat. No. 3,862,095); polyimides; polyetherimides, such as Ultem ®[7]; polyetheretherketones, such as Victrex ® PEEK[8] and polyetherketone or polyetherketoneketone, such Stilan ® PEK or PEKK[9]; polysulfones (see U.S. Pat. Nos. 4,175,175 and 4,108,837), such as Udel ® and Radel ® A-400[10]; the polyethersulfones (see U.S. Pat. Nos. 4,008,203, 4,175,175 and 4,108,837), such as Victrex ® PES[11]; polyarylsulfones; polyarylamideimides, such as Torlon ®[12]; and the like.

7. Available from General Electric Company Company, Plastics Business Group, Pittsfield, Mass. 8. Available from ICI Advanced Materials, Wilmington, Del. 19897 9. Available from Rsychem Corporation 10. Manufactured by Amoco Performance Products Inc., Ridgefield, Conn. 11. Available from ICI Advanced Materials, Wilmington, Del. 19897 12. Available from Amoco Chemical Company, Chicago, Ill.

The preferred fibers are those made from the engineering plastics, such as the polyarylethers which include the polyetherimides, the polyetheretherketones, the polyetherketones, the polyetherketoneketone, the polysulfones, the polyethersulfones, the polyarylsulfones, the polyarylamideimides, and the like. Particularly preferred fibers are those made from polyetheretherketones, polyetherimides, polyarylamides, polyarylamideimides, polysulfones, polyethersulfones and polycarbonates.

The fibers are typically in the form of short cut fibers, i.e., staple fibers, ranging from about 2.5 millimeters to about 13 millimeters. Longer fibers may be used and when they are used, they typically concentrate at or near the syntactic foam's surfaces, as a result of migration during expansion. The diameter of the fibers may range considerably. Preferably, the fiber diameter ranges from about 20 $\mu$m to about 70 $\mu$m, preferably from about 30 $\mu$m to about 60 $\mu$m.

A typical resin formulation comprises the following:

| Formulation | Percent By Weight | Preferred Percent By Weight |
|---|---|---|
| Bisphenol A epoxy resin | 40 to 80 | 60 to 75 |
| * * * | | |
| A preferred resin comprises a mixture of (a) a solid resin and a liquid resin that yield a soft, non-pourable, tacky, resin; or (b) a mixture of liquid redw that yield a soft, non-pourable, tacky resin; or (c) a mixture of a liquid Bisphenol A epoxy resin and low molecular weight novolak epoxy resin. | | |
| An elastomer toughening agent. | 0 to 12 | 3 to 9 |
| * * * | | |
| A desirable roughening agent may be a carboxylated butadiene acrylonitrile copolymer elastomer, an ABS block copolymer elastomer, and SBS block copolymer elastomer. | | |
| Hydroxyl extender for the epoxy resin(s). | 0 to 20 | 4 to 12 |
| * * * | | |
| The preferred extender is biophenol A. | | |
| Amine curing agent. | 4 to 12 | 5 to 10 |
| * * * | | |
| Preferred amine curing agents illclude aliphatic amities, alkylene oxide amities, aromatic amities and aromatic ureas. | | |
| Diluent. | 0 to 2 | 0 |
| * * * | | |
| A variety of conventional ether, ketone, acetate, and the like diluent may be added to facilitate compatibility. They are typically removed by evaporation once the film is formed. | | |
| Thermoplastic fibers | 0 to 20 | 6 to 14 |

These resin formulations are made by conventional mixing of the components in standard mixing equipment for viscous compositions. Good results have been obtained using a Ross ® Double Planetary Mixer, provided with vacuum construction and jacketing to control temperature and deaerate the mixture. Mixing is typically effected by blending the resin, unexpanded particles, elastomer components, extenders, diluents, curing agent and fibers (these being added last), and vacuum pumping to remove entrained air. The temperature chosen is variable depending on the viscosity of the formulation. It may be desirable to separately mix the resin and the curing agent. In such a case, the formulation may be divided up to mix the resin with some portion of the formulation to effect a well dispersed condition and do the same with the curing agent, and then combine the well dispersed mixes with the fiber component and the unexpanded particles, so as to mix them all under conditions avoiding premature reaction. Such procedures are well within the skill of the art.

Calenaring of the resin formulation into the thin films of the invention are illustrated in the drawings. As shown in FIG. 1, which is an isometric-like schematic illustration of a calendaring line 1 for calendaring a nonreinforced film, thermosetting matrix resin formulation (containing punexpanded, in situ-expandable particles) feed 3 is fed to nip rolls 5. Nip rolls 5 are calendar rolls spaced apart to the desired thickness of the film 7. It is desirable in the practice of the invention to avoid drawing action of film 7 after extrusion formation by rolls 5. Rolls 5 may vary in width, wider rolls generating more throughput and narrower rolls providing more control over film thickness from edge to edge. Because this invention is concerned with films of essentially uniform thickness from edge to edge, and front to back, it is desirable to use calendar rolls that are less than about 36 inches wide. A convenient width is about 12 to about 18 inches. Manufacture of films meeting the specifications of this invention are easier at those widths. Because the viscosity of feed 3 is not excessive, one may look at the calendaring operation as a filming operation, akin to roller coating. The distance between rolls 5 is maintained by a force balance (not shown) between the hydraulic pressure pushing on the roll and the off-setting matrix fluid pressure acting in the opposite direction to the roll.

Once film 7 is formed, it is frequently desirable to reduce the matrix resin viscosity in the film. Temperature reduction of film 7 reduces viscosity which reduces flow within the film and thus helps to preserve its dimensions. This may be accomplished by passing film 7 over one or more chilled rollers 9, 13 and 15. If used as chilled rollers, they are typically internally cooled via internal jacketing, to temperatures from about 0° C. to about 25° C., sufficiently low enough to prevent any sagging or flow of the resin matrix. The chill rollers, by cooling the film, increase the resin's elastic modulus so that resin flow is decreased and film dimensional stability is maintained. In the configuration of FIG. 1, roller 9 may be utilized as a chilled roller, a guide roller for alignment purposes and/or a take-up roller, as desired. For handling convenience, release paper or plastic (viz., polyethylene film) layers 12 and 14 may be applied to the outside surfaces of film 7, from their corresponding core rolls, under or over rolls 13 and 15, as may be the case, to form a sandwiched construction. The so protected film 19, as a sandwiched construction, is rolled up onto core 17.

Figure 2:
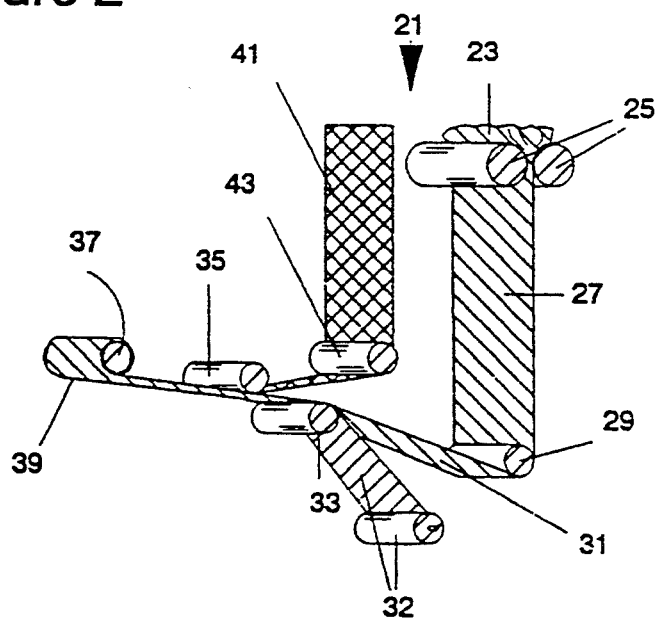
FIG. 2 is a schematic perspective (partially isometric) illustration of a variation of the calendaring system of FIG. 1 which has means for including a supporting scrim layer in the thin film.

FIG. 2 shows another calendaring line, 21, which comprises feed 23 containing expandable particles, calendar rolls 25, film 27, rollers 29, 33 and 35, core and film 32, corresponding to feed 3, calendar rolls 5, film 7, rollers 9, 13 and 15, core and film 12, respectively, of FIG. 1. What is different in FIG. 2 is the use of a scrim layer 41, comprised of an open woven, nonwoven or knitted scrim construction, that is guided by roller 43 to roller 35 to be pressed into contact with film 27 by way of passage under roller 35. This sandwiched construction is collected as roll 39 on core 37.

Figure 3:
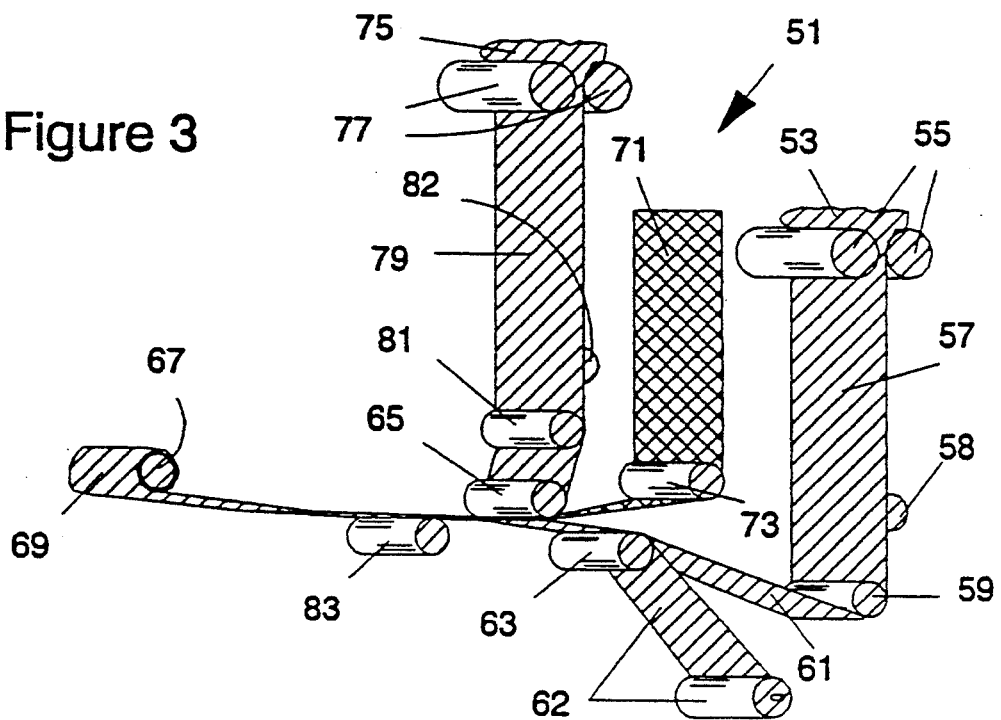
FIG. 3 is a schematic perspective (partially isometric) illustration of a variation of the calendaring system of FIG. 2 which has means for sandwiching a supporting scrim layer in the thin film.

FIG. 3 offers another calendaring line, 51, comprising feed 53, calendar rolls 55, film 57, rollers 59, 63 and 65, core and film 62, corresponding to feed 3, calendar rolls 5, film 7, rollers 9, 13 and 15, core and film 12, respectively, of FIG. 1 and scrim layer 71, comprised of an open woven, nonwoven or knitted scrim construction, that is guided by roller 43 to roller 35 to be pressed into contact with film 27 by way of passage under roller 35. In line 51, the difference is the inclusion of an additional chiller roller 58 to control the viscosity of film 57, and a second film line, in order to form a two-layer film composite structure. The second film line comprises matrix feed 75, with unexpanded particles, that is formed into film 79 by calendar rolls 77, passed over chilled roller 82, guided and further cooled by guide and chilled roller 81. It is then merged into contact with scrim layer 71, film layer 61, and release layer 62 at roller 65, and the composite then passed over guide roller 83 to be taken up as composite film 69 on core 67.

The invention also contemplates the inclusion of one or more layers of a nonwoven fabric provided with a resin binder that is co-curable with the matrix resin. These added layers serve to enhance the impact and buckling resistance of the composite structure. The non-woven layer is typically provided as an outside layer, such as a substitute for release layer 62, to provide a support surface for the thin The nonwoven structures may be formed from unspun or spun staple fibers having a length of from about ¼ inch to about 3 inches by garnetting and crosslaying, airlaying on a rotating screen or on an endless tenter arrangement according to the procedure of U.S. Pat. No. 3,538,564, utilizing the apparatus of U.S. Pat. Nos. 3,345,231 and 3,345,232. The nonwoven structures may be resin impregnated by spraying the thermosetting resin as a solvent solution into the batting or scrim-like structures. Preferably, the nonwoven is first bonded with a low cost thermoplastic from a latex or water dispersion or with starch from an aqueous solution, dried to fix the fibers in the nonwoven structure, and then pthe nonwoven structure is impregnated with the thermosetting resin. The nonwoven can be supported by a scrim layer in much the same manner that the thin film is supported by one or more scrim layers 71.

Figure 4:
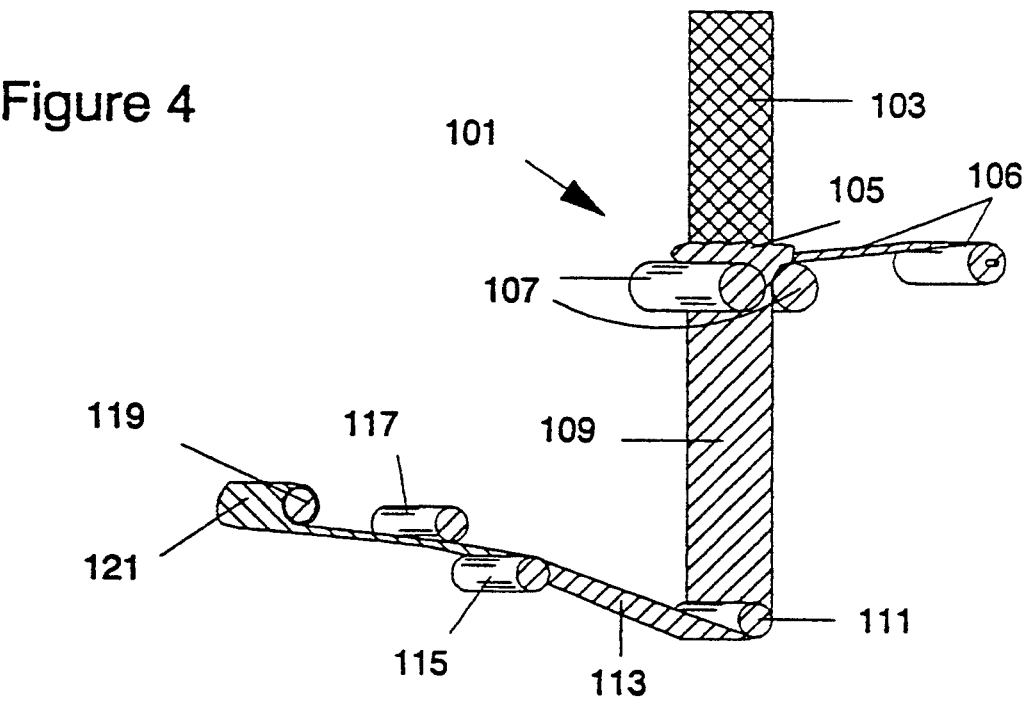
FIG. 4 is a schematic perspective (partially isometric) illustration of a variation of the calendaring system of FIG. 1 which has means for including in the calendaring step a supporting scrim layer within the thin film.

FIG. 4 is a simpler and preferred method for making a scrim-supported composite. In line 101, scrim layer 103 is fed centered of the space between calendar rolls 107 and the thermosetting resin matrix feed 105 with the unexpanded particles is uniformly applied to both of the rolls so that there is an essentially equivalent amount on both sides of scrim film 103. At the same time, release layer 106, supplied from its core, is passed over one of the rolls 107 to form an outside release surface. This composite is passed over chilled and guide roller 111, to form sandwiched film 113 containing matrix resin with a thin inner scrim layer. The sandwiched film is passed over guide and chilled rollers 115 and 117 to be collected as composite film 121 on core 119.

Figure 5:
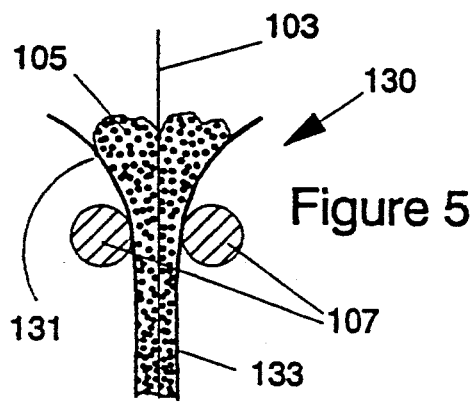
FIG. 5 is a schematic cross-sectional edge-view of the feed end of the calendaring operation of FIG. 4, characterizing the particles of in situ-expandable thermoplastic polymer uniformly mixed in a thermosetting resin matrix.

FIG. 5 shows another way of forming a scrim composited film. In system 130, the scrim layer 103 is fed to the calendar rolls 107 with the matrix resin feed shown to contain particles of in situ-expandable thermoplastic. In this system, outside release layers 131 and 133 are passed over calendar rolls 107 to insure that the film is formed between them. The resulting film can be cooled and collected as noted above.

Figure 6:
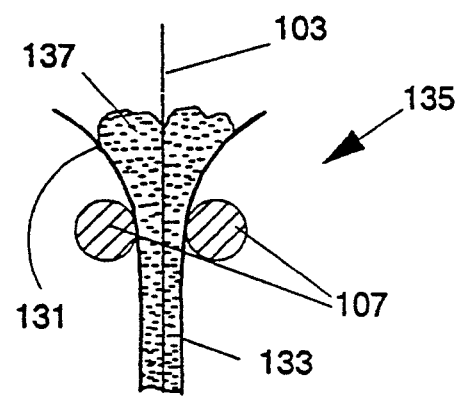
FIG. 6 is a schematic cross-sectional edge-view of the calendaring operation of FIG. 5, characterizing uniformly distributed staple fibers amongst the particles of in situ-expandable thermoplastic polymer distributed uniformly in the thermosetting resin matrix.
Figure 7:
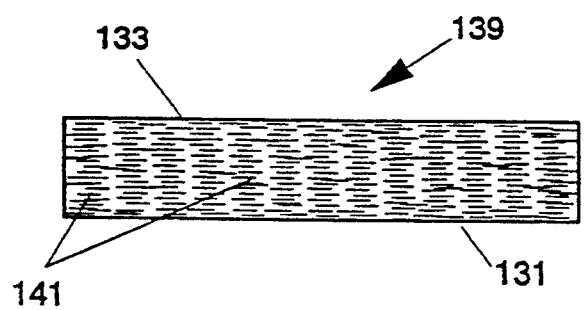
FIG. 7 is an schematic edge-view of a thin film segment formed in the calendaring operation of FIG. 6 illustrating the manner of orientation of the staple fibers in the thin film of matrix resin.

In FIG. 6, system 135 is the same as system 130 of FIG. 5, except that the resin matrix 137 also contains short staple fiber with the thermal characteristics noted above. In the preferred case, the fiber length is about ¼ inch. The mass is film-formed and the construction has the characteristics shown in FIG. 7. In FIG. 7, the film 139 comprises staple fibers 141 well dispersed in the non-pourable film. Also present in the film, but not illustrated, are the unexpanded, in situ-expandable thermoplastic particles. The fibers are caused to be oriented in the film more in the direction of flow of the matrix resin, consequently, more fibers will be found to be oriented parallel to the film's surfaces.

Figure 8:
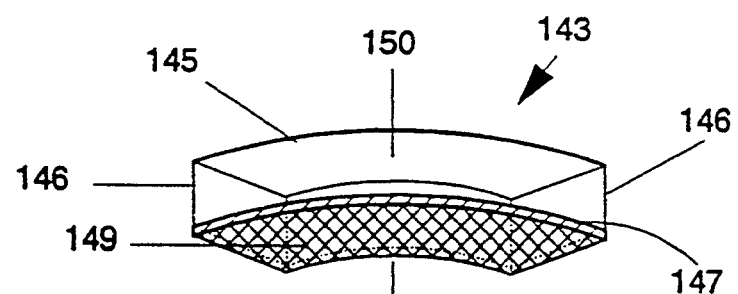
FIG. 8 in an perspective end-view of a mold containing the thin film of the invention, suitable for forming molded pieces.
Figure 9:
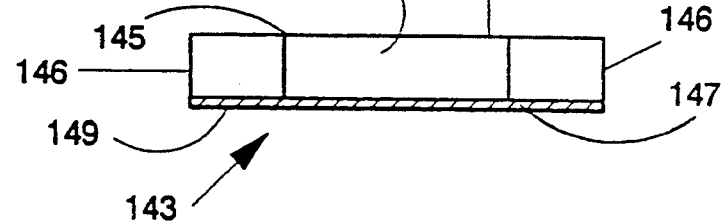
FIG. 9 is a plan end-view of the mold of FIG. 8.

Molding of the films of the invention to produce molded syntactic foams is simple and straightforward. For example, as shown in FIG. 8, a mold 143, shown as having an open end, is a split mold of the configuration shown. In this case, the mold is a slice of a cylinder. The mold defines the shape of the resulting syntactic foam. Mold 143 comprises arcuate top and bottom walls 145 and 149 and arcuate front and back walls 150 and 148, and sidewalls 146. The unexpanded film, as one or more layers 147 are cut to the shape and size of surface 149, and then laid onto that surface. The mold is then closed and heat is applied to the mold. The temperature to which the mold is heated is dependent upon several considerations, such as the temperature at which crosslinking of the thermosetting matrix resin is initiated, the melting and/or second order transition temperature of the fiber, if present, the desired syntactic foam density if the blowing agent used in the particle overlaps the crosslinking temperature of the resin, and the like considerations. With the use of epoxy resins, the cure temperature is typically at 350° F. (177° C.) or 250° F. (121° C.).

In the above noted processes, the release layers may be substituted for by other materials such as syntactic foams comprising rigid microballoons in a resin matrix comprises microballoons (microspheres) embedded in the uncured or partially cured matrix resin. In this case, the matrix resin may be any of the resins described above with respect to the film of the invention. The most common of the microballoons are made of glass, but quartz, phenolic, carbon, thermoplastic and metal coated microballoons are usable. A Syncore ® is suitable for this purpose.

The microballoons in those syntactic foam films are synthetic hollow microspheres that comprise individual round spheres or bubbles having diameters which range from about 1 to about 500 microns, preferably about 1 to about 200 microns, with wall thicknesses of about 0.1 to about 20 microns. They typically possess densities ranging from about 0.1 to about 0.5 g./cc. The syntactic foam comprising the rigid microballoons in a resin matrix as a result have relatively low densities such as densities ranging from about 0.5 to about 0.7 g./cm.3. Glass is the most common microballoon material in these types of materials, but quartz, phenolic, carbon, thermoplastic and metal coated microballoons are suitably employable.

Such syntactic foam used in composites with the films of the invention may have a thickness ranging from about 0.007 to about 0.125 inch. Each such film would be uniform in thickness.

I claim:

1. A tacky and drapable, non-pourable film having a uniform thickness, that contains (i) a non-pourable thermosetting matrix resin system and (ii) particles of a microcellular in situ-expandable thermoplastic polymer containing an expansion agent therein in which both (i) and (ii) are uniformly distributed throughout the film, so that upon expansion of the thermoplastic polymer into microcells in the non-pourable film, the resulting film is a thermoset thin film syntactic foam the thickness of which is about 1.01 to about 4 times greater than the non-expanded film, which film is composited with at least one layer of another material.

2. The thin and drapable, in situ-expandable tacky film of claim 1 wherein the other material strengthens the film prior to expansion and conversion to the thermoset state.

3. The thin and drapable, in situ-expandable tacky film of claim 2 wherein the other material is calendared to the film.

4. The thin and drapable, in situ-expandable tacky film of claim 3 wherein the other layer of material comprises scrims, foils and plastic films.

5. The thin and drapable, in situ-expandable tacky film of claim 3 wherein the other material sandwiches the film.

6. The thin and drapable, in situ-expandable tacky film of claim 3 wherein the bond of the film to the other material is effected through the tackiness of the film.

7. The thin and drapable, in situ-expandable tacky film of claim 3 wherein the material is an open scrim.

8. The thin and drapable, in situ-expandable tacky film of claim 3 wherein the open scrim is one or more of a woven, nonwoven or knitted scrim.

9. The thin and drapable, in situ-expandable tacky film of claim 1 wherein the film is composited with an uncured syntactic foam that comprises thin films of uniform thickness which contain rigid microballoons uniformly dispersed in a resin matrix.

10. The thin and drapable, in situ-expandable tacky film of claim 9 wherein the resin matrix in the film and the uncured syntactic foam are cocurable.

11. The thin and drapable, in situ-expandable tacky film of claim 1 wherein the thin and drapable, tacky film is composited with a layer of a prepreg.

12. The film of claim 1 scrolled into a small diameter tube about which is adhered one or more prepreg layers containing carbon fiber reinforcement to form a composite tube containing a small hole in the center.

* * * * *